(12) United States Patent
Dao et al.

(10) Patent No.: US 11,126,980 B2
(45) Date of Patent: Sep. 21, 2021

(54) SYSTEMS AND METHODS FOR TOKEN LINKING AND UNLINKING IN DIGITAL WALLETS

(71) Applicant: JPMorgan Chase Bank, N.A., New York, NY (US)

(72) Inventors: Tuan Dao, Richardson, TX (US); Gayathri Sundar, Irving, TX (US); Aditya Chebiyyam, McKinney, TX (US); Rajitha Dissanayake, Frisco, TX (US); Yunchul Bryan Jeon, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/184,617

(22) Filed: Nov. 8, 2018

(65) Prior Publication Data
US 2020/0151689 A1    May 14, 2020

(51) Int. Cl.
*G06Q 20/10*    (2012.01)
(52) U.S. Cl.
CPC ................. *G06Q 20/105* (2013.01)
(58) Field of Classification Search
CPC .... G06Q 20/105; G06Q 20/36; G06Q 20/367; G06Q 20/3672
See application file for complete search history.

(56) References Cited

U.S. PATENT DOCUMENTS

| | | | | |
|---|---|---|---|---|
| 10,460,312 B1* | 10/2019 | Kurani | ............... | G06Q 20/36 |
| 2012/0159148 A1* | 6/2012 | Behren | ............... | G06Q 20/3278 713/150 |
| 2013/0152185 A1* | 6/2013 | Singh | ............... | G06Q 20/36 726/9 |
| 2013/0254115 A1* | 9/2013 | Pasa | ............... | G06Q 20/3572 705/67 |
| 2014/0344153 A1* | 11/2014 | Raj | ............... | G06Q 20/3821 705/44 |
| 2015/0046339 A1* | 2/2015 | Wong | ............... | G06Q 20/3829 705/71 |
| 2015/0058191 A1* | 2/2015 | Khan | ............... | G06Q 20/40 705/35 |

(Continued)

*Primary Examiner* — Bennett M Sigmond
*Assistant Examiner* — Raven E Zeer
(74) *Attorney, Agent, or Firm* — Greenberg Traurig LLP

(57) ABSTRACT

Systems and methods for token linking and unlinking in digital wallets are disclosed. In one embodiment, a method for token linking in digital wallets may include: an issuer wallet application executed by the information processing device requesting, from a token vault, an identification of a customer's accounts that are eligible for push-provisioning to a third party wallet application executed by the information processing device; receiving the identification of customer accounts from the token vault; identifying accounts provisioned in the third party wallet application; determining accounts from the customer accounts that have not been provisioned to the third party wallet application to provision to the third party wallet application; provisioning the determined accounts to the third party wallet application; and requesting the token vault link a token associated with the provisioned account to an issuer wallet associated with the issuer wallet application.

13 Claims, 5 Drawing Sheets

(56) References Cited

U.S. PATENT DOCUMENTS

| | | | |
|---|---|---|---|
| 2015/0327071 A1* | 11/2015 | Sharma | G06Q 20/105 |
| | | | 726/6 |
| 2015/0332262 A1* | 11/2015 | Lingappa | G06Q 20/322 |
| | | | 705/71 |
| 2016/0026999 A1* | 1/2016 | Kurian | G06Q 20/363 |
| | | | 705/44 |
| 2016/0086184 A1* | 3/2016 | Carpenter | G06Q 20/4016 |
| | | | 705/44 |
| 2016/0094991 A1* | 3/2016 | Powell | G06Q 20/32 |
| | | | 455/411 |
| 2017/0083882 A1* | 3/2017 | Kim | G06Q 20/4012 |
| 2017/0270517 A1* | 9/2017 | Vasu | G07C 9/00309 |
| 2017/0373852 A1* | 12/2017 | Cassin | H04L 63/062 |
| 2018/0101857 A1* | 4/2018 | Deliwala | G06Q 30/0226 |
| 2018/0108008 A1* | 4/2018 | Chumbley | G06Q 20/3674 |
| 2018/0158052 A1* | 6/2018 | Tseretopoulos | G06Q 20/3829 |
| 2019/0180275 A1* | 6/2019 | Safak | G06Q 20/3827 |
| 2019/0385151 A1 | 12/2019 | Dao et al. | |

* cited by examiner

SYSTEMS AND METHODS FOR TOKEN LINKING AND UNLINKING IN DIGITAL WALLETS

BACKGROUND OF THE INVENTION

1. Field of the Invention

The present disclosure generally relates to systems and methods for token linking and unlinking in digital wallets.

2. Description of the Related Art

As the use of digital wallets has increased, consumers have access to a number of different digital wallet applications on mobile platforms. An issuing bank that provides a digital wallet is often faced with challenges working in unison with third party digital wallet providers on mobile platforms, such as extending benefits to its customers using the third party digital wallet applications.

SUMMARY OF THE INVENTION

Systems and methods for token linking and unlinking in digital wallets are disclosed. In one embodiment, in an information processing device comprising at least one computer processor, a method for token linking in digital wallets may include: (1) an issuer wallet application executed by the information processing device requesting, from a token vault, an identification of a customer's accounts that are eligible for push-provisioning to a third party wallet application executed by the information processing device; (2) the issuer wallet application receiving the identification of customer accounts from the token vault; (3) the issuer wallet application identifying accounts provisioned in the third party wallet application; (4) the issuer wallet application determining accounts from the customer accounts that have not been provisioned to the third party wallet application to provision to the third party wallet application; (5) the issuer wallet application provisioning the determined accounts to the third party wallet application; and (6) the issuer wallet application requesting the token vault link a token associated with the provisioned account to an issuer wallet associated with the issuer wallet application In one embodiment, the issuer wallet application may update a token wallet characteristic field for the linked token.

In one embodiment, the issuer wallet application may determine accounts to provision to the third party wallet application by comparing the customer accounts from the customer accounts from the token vault to the accounts already provisioned in the third party wallet application.

In one embodiment, the token vault may update a token wallet characteristic field for the linked token.

In one embodiment, the method may further include the issuer wallet application receiving confirmation from the token vault that token is linked.

In one embodiment, an issuer backend may treat the linked token in the third party wallet application the same as a token in the issuer wallet application when conducting a transaction.

In one embodiment, the account may be provisioned by push provisioning.

According to another embodiment, in an information processing device comprising at least one computer processor, a method for token linking in digital wallets may include: (1) an issuer wallet application executed by the information processing device requesting, from a token vault, an identification of a customer's accounts in a customer profile; (2) the issuer wallet application receiving the identification of the customer's accounts from the token vault; (3) the issuer wallet application identifying accounts provisioned in the third party wallet application; (4) the issuer wallet application determining an account that is not linked to the issuer wallet; and (5) the issuer wallet application requesting the token vault link a token associated with determined account to the issuer wallet.

In one embodiment, the issuer wallet application may update a token wallet characteristic field for the linked token.

In one embodiment, the token vault may update a token wallet characteristic field for the linked token.

In one embodiment, the method may further include the issuer wallet application receiving confirmation from the token vault that the token is linked.

In one embodiment, an issuer backend may treat the linked token in the third party wallet application the same as a token in the issuer wallet application when conducting a transaction.

In another embodiment, a system for token linking in digital wallets may include a token vault comprising a plurality of tokens; and an electronic device comprising at least one computer processor an executing an issuer wallet application and a third party wallet application. The issuer wallet application may request, from the token vault, an identification of a customer's accounts that are eligible for push-provisioning to the third party wallet application; receive the identification of customer accounts from the token vault; identify accounts provisioned in the third party wallet application; determine accounts from the customer accounts that have not been provisioned to the third party wallet application to provision to the third party wallet application; provision the determined accounts to the third party wallet application; and request the token vault link a token associated with the provisioned account to the issuer wallet. The token vault may mark of identify the third party token as linked to the third party wallet.

In one embodiment, the issuer wallet application may update a token wallet characteristic field for the linked token.

In one embodiment, the token vault may update a token wallet characteristic field for the linked token.

In one embodiment, the token vault may provide the issuer wallet application with confirmation from the token vault that token is linked.

In one embodiment, the system may further comprise an issuer backend. The issuer backend may treat the linked token in the third party wallet application the same as a token in the issuer wallet application when conducting a transaction.

In one embodiment, the account may be provisioned by push provisioning or by in-application provisioning.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems and methods for token linking in digital wallets.

In embodiments, tokens in third party wallets are identified and linked. In the process of linking, issuer systems (e.g., backend, payment systems, etc.) may keep track of linking status of such tokens.

In one embodiment, when a customer is using the issuer wallet application, tokens may be linked when the customer successfully adds any card in the issuer wallet application to the third party wallet application. For example, the issuer wallet application may communicate the token created during the process to the issuer's backend, which may identify the token as linked to the issuer wallet so that benefits may be extended.

In another embodiment, when a customer uses the issuer wallet application to perform a checkout at a NFC-enabled POS terminal, the issuer wallet application may invoke a "checkout module" that may be part of the issue wallet application that may present an appropriate interface for the checkout. The checkout module may work with customer specific tokens stored in issuer's token vault and all issuer-specific tokens in the third party wallet application. This may enable the issuer wallet application to communicate the tokens discovered to the issuer backend that may then identify the tokens as linked or unlinked.

In one embodiment, a Token Wallet Characteristic (TWC) and/or a Token Transaction Characteristic (TTC) may be used to identify the token(s) as linked or unlinked. Examples of the use of the TWC and TTC are disclosed, for example, in U.S. patent application Ser. No. 16/010,677, the disclosure of which is hereby incorporated, by reference, in its entirety.

Figure 1:
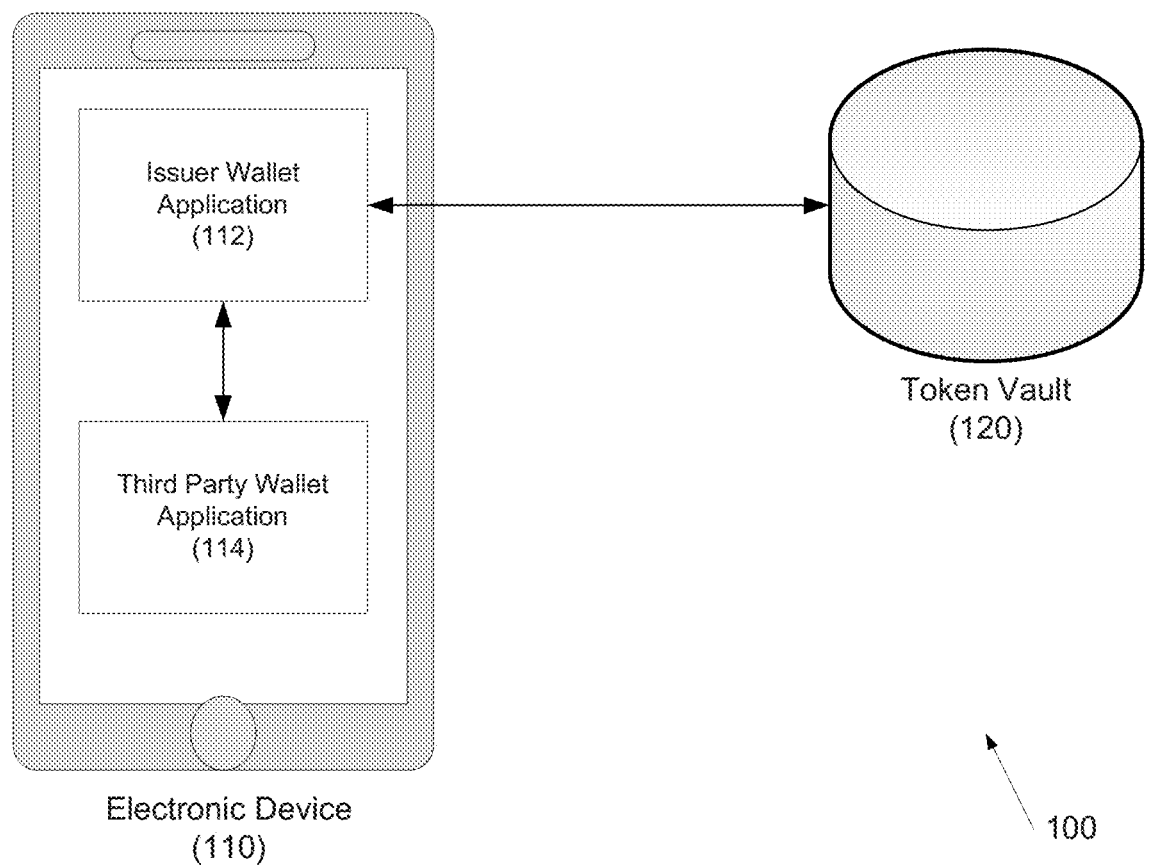
FIG. 1 depicts a system for token linking in digital wallets according to one embodiment.

Referring to FIG. 1, a system for token linking in digital wallets is disclosed according to one embodiment. System 100 may include electronic device 110, which may be any suitable electronic device (e.g., smartphone, tablet computer, smartwatch, notebook computer, desktop computer, etc.). Electronic device 110 may execute computer programs or applications, such as issuer wallet application 112 and third party wallet application 114. Each of issuer wallet application 112 and third party wallet application 114 may be associated with a backend (not shown).

System 100 may further include token vault 120, which may maintain payment tokens for the issuer. In one embodiment, token vault 120 may be provided by the issuer; in another embodiment, token vault 120 may be provided by a third party.

Figure 2:
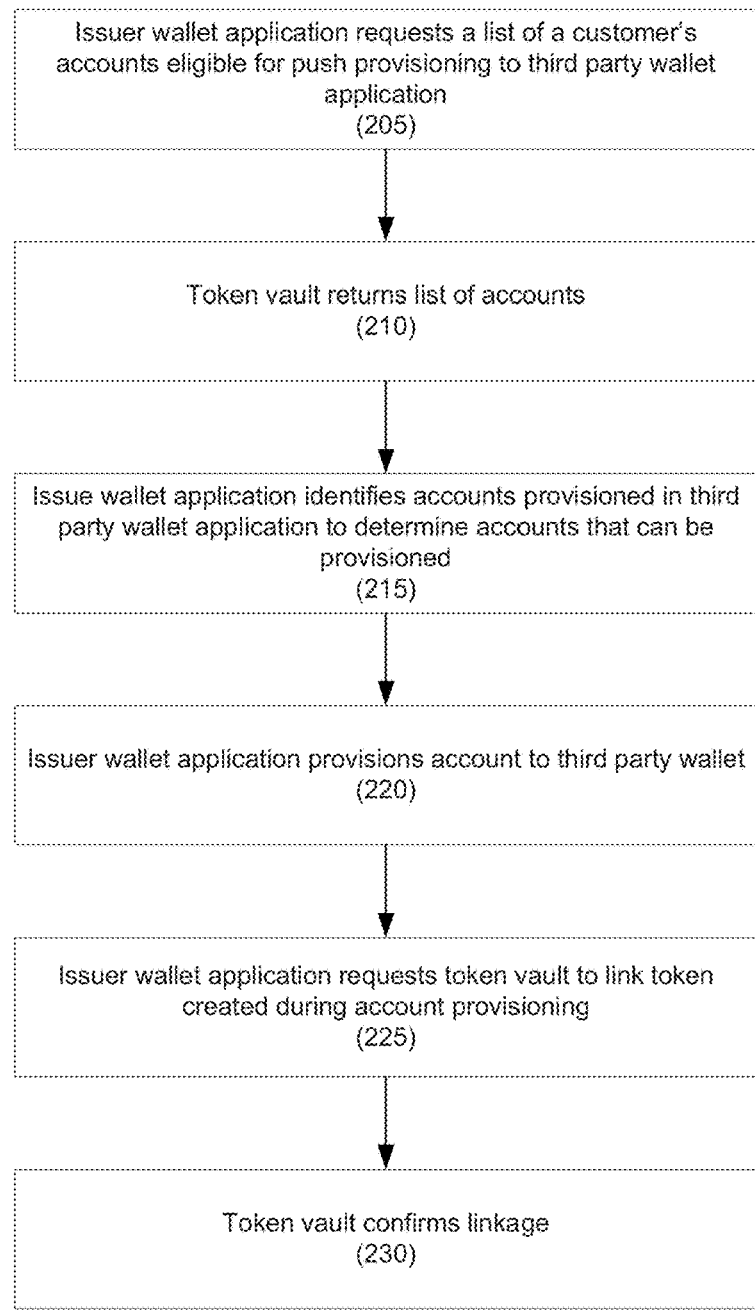
FIG. 2 depicts a method for token linking in digital wallets according to one embodiment.

Referring to FIG. 2, a method for token linking in digital wallets is disclosed according to one embodiment. In step 205, an issuer wallet application executed by an electronic device may request a list of a customer's accounts that are eligible for push provisioning to a third party wallet application. In one embodiment, the request may be made to a token vault, and the accounts may be maintained in a customer profile.

In another embodiment, the request may be made to an issuer backend.

In one embodiment, the request may identify the specific third party wallet for push provisioning.

In step 210, the token vault or issuer backend may return a list of accounts that are eligible for push provisioning.

In step 215, the issuer wallet application may identify accounts that are provisioned in the third party wallet application to determine which accounts can be provisioned. For example, the issuer wallet application may compare the tokens returned by the token vault to the tokens already provisioned in the third party wallet application to determine which account(s) needs to be provisioned.

In step 220, the issuer wallet application may provision the accounts to the third party wallet application using, for example, in-application push provisioning.

In step 225, following successful provisioning, the issuer wallet application may make a service call to the token vault to link the token created in the in-application push provisioning process. In one embodiment, the token vault may update the Token Wallet Characteristic (TWC) field for the token.

In step 230, the token vault may respond with confirmation that the token is linked. In one embodiment, the issuer wallet application may update the TWC field for the token.

Figure 3:
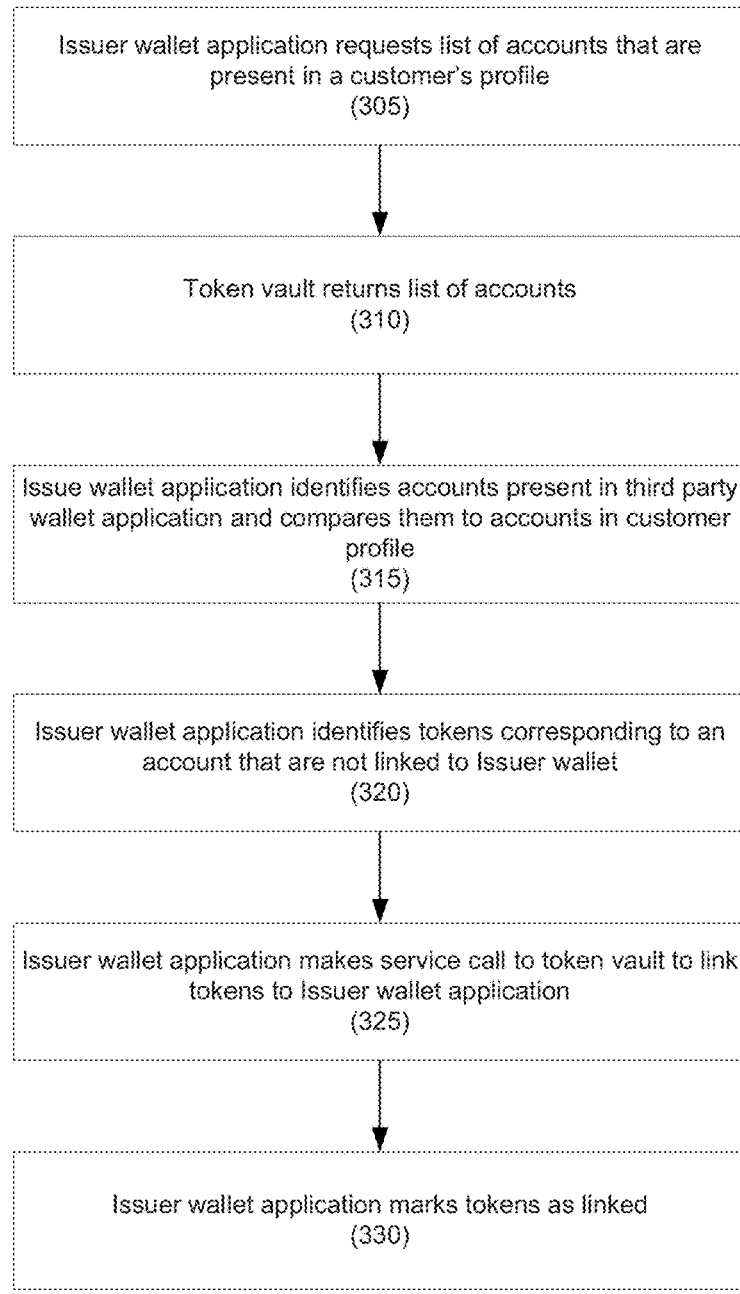
FIG. 3 depicts a method for token linking in digital wallets according to one embodiment.

Referring to FIG. 3, a method for token linking in digital wallets is disclosed according to another embodiment. In step 305, an issuer wallet application executed by an electronic device may request a list of a customer's accounts that are present in the customer's profile.

In step 310, the token vault or issuer backend may return a list of accounts in the customer's profile.

In step 315, the issuer wallet application may identify accounts that are present in the third party wallet application and may compare this to the accounts in the customer's profile, and, in step 320, the issuer wallet application may identify tokens in the third party wallet corresponding to an account that are not linked to the issuer wallet application.

In step 325, the issuer wallet application may make a service call to the token vault to link the identified tokens in the third party wallet to the issuer wallet application. In one embodiment, the token vault may update the TWC field for each token in the service call.

In step 330, following a successful response, the issuer wallet application may identify the tokens as linked. The issuer wallet application may then update the TWC field for the token.

Figure 4:
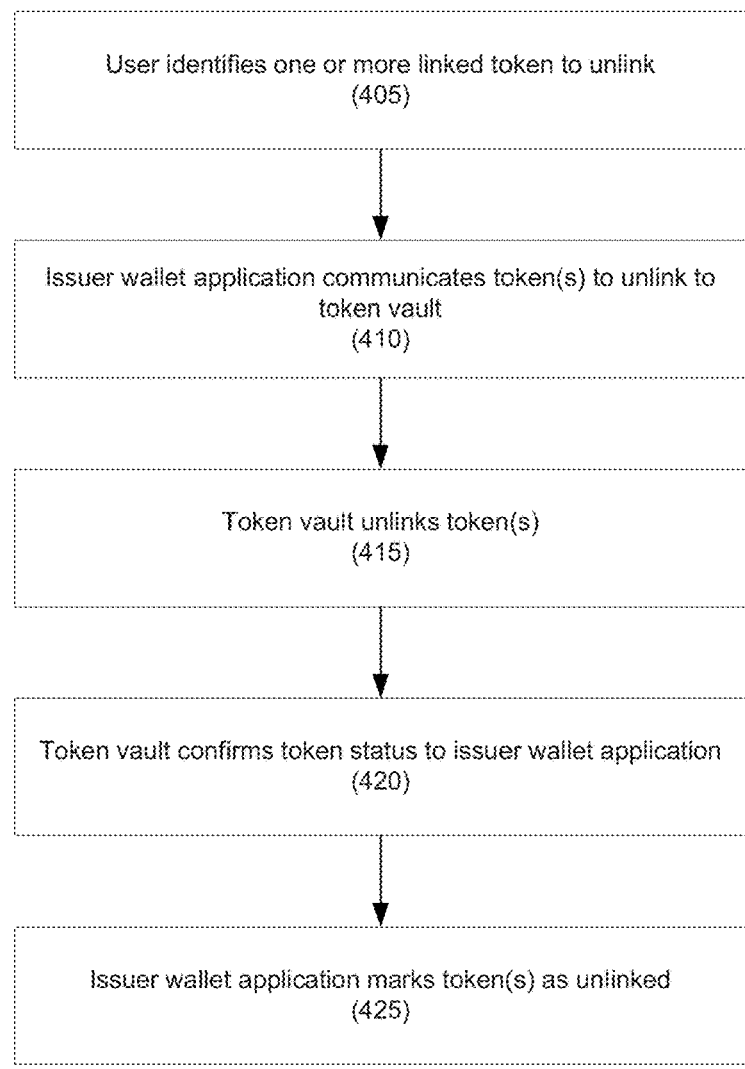
FIG. 4 depicts a method for token unlinking in digital wallets according to one embodiment.

Referring to FIG. 4, a method for token unlinking in digital wallets is disclosed according to one embodiment. Token unlinking is the process of removing the linkage from an already linked token. An unlinked token will stop receiving additional benefits that may be associated with the issuer wallet application that a linked token would otherwise receive.

In FIG. 4, the unlinking may be initiated by the user of an electronic device.

In step 405, a user of an electronic device having linked tokens may initiate unlinking using, for example, an issuer wallet application. In one embodiment, the user may identify one or more tokens to unlink, or the user may request that all linked tokens on the electronic device be unlinked.

In step 410, the issuer wallet application communicates an unlinking request to a token vault.

In step 415, the token vault may unlink the requested token(s). In one embodiment, the token vault may modify the token wallet characteristic for each token that is unlinked.

In step 420, the token vault may confirm the unlinking to the issuer wallet application, and, in step 425, the issuer wallet application may modify the token wallet characteristic for each token that is unlinked. The issuer wallet application may inform the user of the change of token state.

Figure 5:
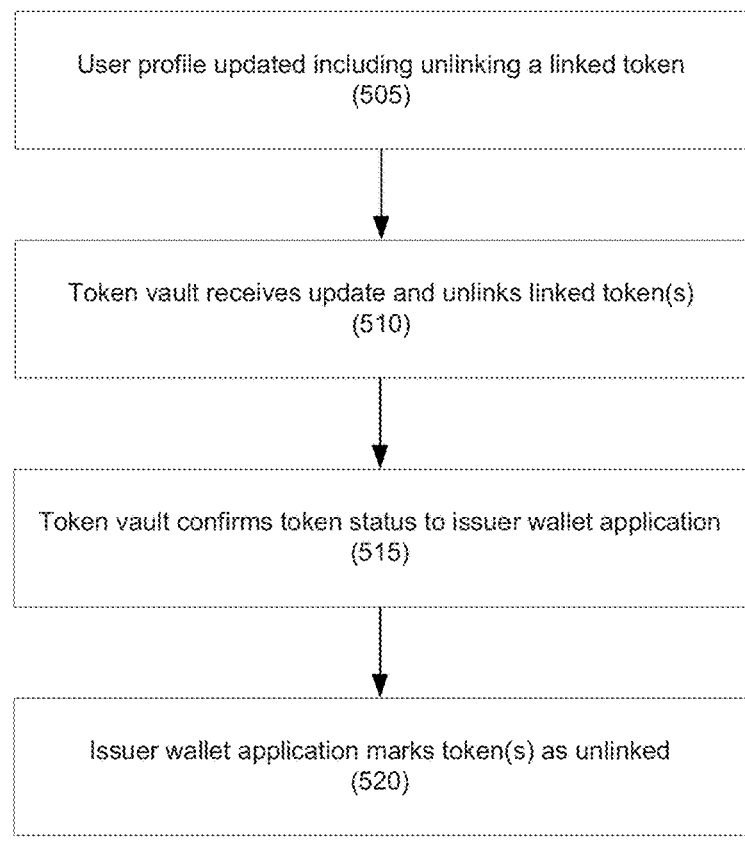
FIG. 5 depicts a method for token unlinking in digital wallets according to another embodiment.

Referring to FIG. 5, a method for token unlinking in digital wallets is disclosed according to another embodiment. In FIG. 5, the unlinking may be initiated by the issuer, the token vault, etc.

In step 505, an update to a user profile may be initiated by the user, or by the issuer. The update may involve unlinking one or more tokens.

In step 510, the token vault receives the update, and unlinks one or more tokens. In one embodiment, a single linked token, a selected subset of linked tokens, or all of the user's linked tokens may be unlinked.

In one embodiment, the token vault may update the TWC field for each token that is unlinked.

In step 515, the token vault may communicate the updated token status for each unlinked token to the issuer wallet application, and, in step 520, the issuer wallet application may update the TWC fields for each unlinked token.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for token linking in digital wallets, comprising:
   requesting, by an issuer wallet application executed by a mobile electronic device comprising at least one computer processor and from a token vault, an identification of a plurality of customer accounts that are eligible for push-provisioning to a third-party wallet application also executed by the mobile electronic device;
   receiving, by the issuer wallet application, the identification of the plurality of customer accounts from the token vault;
   accessing, by the issuer wallet application, the third-party wallet application;
   identifying, by the issuer wallet application, customer accounts that are provisioned in the third-party wallet application;
   identifying, by the issuer wallet application, one of the plurality of customer accounts that is not provisioned to the third-party wallet application;

provisioning, by the issuer wallet application, a token for the customer account that is not provisioned to the third-party wallet application to the third-party wallet application using in-application push provisioning; and executing, by the issuer wallet application, a service call to the token vault to link each token provisioned to the third-party wallet application to an associated customer account, wherein the token vault links the token to the associated customer account by updating a Token Wallet Characteristic field for the token in the token vault, wherein an issuer backend processes a transaction involving the linked token from the third-party wallet application with the same benefits as a token from the issuer wallet application.

2. The method of claim 1, further comprising:
updating, by the issuer wallet application, a local token wallet characteristic field for the token, wherein the token is configured to be unlinked to the issuer wallet by updating the token wallet characteristic field.

3. The method of claim 1, wherein the issuer wallet application determines accounts to provision to the third-party wallet application by comparing the accounts from the token vault to the accounts provisioned in the third-party wallet application.

4. The method of claim 1, further comprising:
the issuer wallet application receiving confirmation from the token vault that token is linked.

5. A method for token linking in digital wallets, comprising:
requesting, by an issuer wallet application executed by a mobile electronic device comprising at least one computer processor and from a token vault, an identification of a plurality of customer accounts in a customer profile;
receiving, by the issuer wallet application, the identification of the plurality of customer accounts from the token vault;
accessing, by the issuer wallet application, a third-party wallet application also executed by the mobile electronic device and identifying tokens for accounts provisioned in the third-party wallet application;
identifying, by the issuer wallet application, tokens provisioned in the third-party wallet application that are not linked to an issuer wallet associated with the issuer wallet application; and
executing, by the issuer wallet application, a service call to the token vault to link each token provisioned in the third-party wallet that is not linked to the issuer wallet to the issuer wallet, wherein the token vault links the token to to one of the plurality of customer accounts by updating a Token Wallet Characteristic field for the token in the token vault, wherein an issuer backend processes a transaction involving the linked token from the third-party wallet application with the same benefits as a token from the issuer wallet application.

6. The method of claim 5, further comprising:
updating, by the issuer wallet application, a local token wallet characteristic field for the token, wherein the token is configured to be unlinked to the issuer wallet by updating the token wallet characteristic field.

7. The method of claim 5, further comprising:
the issuer wallet application receiving confirmation from the token vault that the token is linked.

8. A system for token linking in digital wallets, comprising:
a token vault comprising a plurality of tokens;
an electronic device comprising at least one computer processor an executing an issuer wallet application, and a third-party wallet application; and
an issuer backend;
wherein:
the issuer wallet application requests, from the token vault, an identification of a plurality of customer accounts that are eligible for push-provisioning to the third-party wallet application;
the issuer wallet application receives the identification of the plurality of customer accounts from the token vault;
the issuer wallet application accesses the third-party wallet application;
the issuer wallet application identifies customer accounts that are provisioned in the third-party wallet application;
the issuer wallet application identifies one of the customer accounts that is not provisioned to the third-party wallet application;
the issuer wallet application provisions a token for the customer account that is not provisioned to the third-party wallet application to the third-party wallet application using in-application push provisioning; and
the issuer wallet application executes a service call to the token vault to link each token provisioned to the third-party wallet application to an associated customer account, wherein the token vault links the token to the associated customer account by updating a Token Wallet Characteristic field for the token in the token vault, wherein the issuer backend processes a transaction involving the linked token from the third-party wallet application with the same benefits as a token from the issuer wallet application.

9. The system of claim 8, wherein the token vault marks the third party token as linked to the issuer wallet.

10. The system of claim 8, wherein the issuer wallet application updates the token wallet characteristic field for the linked token.

11. The system of claim 8, wherein the field comprises a token wallet characteristic field, wherein the token vault updates the token wallet characteristic field for the linked token, wherein the token is configured to be unlinked to the issuer wallet by updating the token wallet characteristic field.

12. The system of claim 8, wherein the token vault provides the issuer wallet application with confirmation from the token vault that token is linked.

13. The method of claim 1, wherein the token vault provides confirmation that the token vault updated the field in the token.

* * * * *